(12) United States Patent
Takeoka et al.

(10) Patent No.: US 12,496,655 B2
(45) Date of Patent: Dec. 16, 2025

(54) FRICTION STIR JOINING DEVICE, METHOD OF OPERATING THE SAME AND JOINT STRUCTURE

(71) Applicant: KAWASAKI JUKOGYO KABUSHIKI KAISHA, Kobe (JP)

(72) Inventors: Naoki Takeoka, Kakogawa (JP); Ryoji Ohashi, Kobe (JP); Yoshitaka Muramatsu, Akashi (JP); Takuya Fukuda, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/934,617

(22) Filed: Nov. 1, 2024

(65) Prior Publication Data

US 2025/0058403 A1    Feb. 20, 2025

Related U.S. Application Data

(62) Division of application No. 17/282,634, filed as application No. PCT/JP2019/040048 on Oct. 10, 2019, now Pat. No. 12,168,261.

(30) Foreign Application Priority Data

Oct. 11, 2018   (JP) ................................ 2018-192520

(51) Int. Cl.
  *B23K 20/12*   (2006.01)
  *B23K 103/16*   (2006.01)

(52) U.S. Cl.
  CPC .......... *B23K 20/123* (2013.01); *B23K 20/125* (2013.01); *B23K 20/1255* (2013.01); *B23K 2103/16* (2018.08)

(58) Field of Classification Search
  CPC ................ B23K 20/123; B23K 20/125; B23K 20/1255; B23K 2103/16; B23K 2101/18;
  (Continued)

(56) References Cited

U.S. PATENT DOCUMENTS 6,789,722 B2 * 9/2004 Murakami ........... B23K 20/123
  228/2.1
10,293,431 B2 * 5/2019 Okada .................. B23K 20/128
  (Continued)

FOREIGN PATENT DOCUMENTS

CN         1657215 A    8/2005
CN       101342635 A    1/2009
  (Continued)

*Primary Examiner* — Kiley S Stoner
(74) *Attorney, Agent, or Firm* — Oliff PLC

(57) ABSTRACT

A friction stir joining device includes a tool, a rotary driver, a linear-movement driver, and a control device. The control device is adapted to (A) dispose so that a first member opposes to the tool, and the first member, a second member and a third member are located in this order, (B) control the linear-movement driver and the rotary driver so that a tip-end part of the tool presses a joined part of a to-be-joined object while the tool is rotated, (C) control the linear-movement driver and the rotary driver so that the third member softened extends above an upper surface of the second member, and the tip-end part of the tool reaches a first position, and (D) control the linear-movement driver and the rotary driver so that the tool is drawn out from the joined part while the tool is rotated.

6 Claims, 13 Drawing Sheets

(58) Field of Classification Search
CPC ............ B23K 2101/34; B23K 2103/04; B23K 2103/10; B23K 2103/15; B23K 2103/18; B23K 20/1265; B23K 20/227; B23K 20/26; B23K 20/122–128
USPC .............................................. 228/112.1, 2.1
See application file for complete search history.

(56) References Cited

U.S. PATENT DOCUMENTS

| | | | |
|---|---|---|---|
| 2003/0042291 A1* | 3/2003 | Mahoney | B23K 20/1265 228/2.1 |
| 2003/0141343 A1 | 7/2003 | Murakami | |
| 2005/0035180 A1 | 2/2005 | Nishiguchi et al. | |
| 2005/0092809 A1 | 5/2005 | Murakami | |
| 2005/0178817 A1 | 8/2005 | Takase et al. | |
| 2011/0180587 A1 | 7/2011 | Trapp et al. | |
| 2014/0061283 A1 | 3/2014 | Shoji et al. | |
| 2014/0183245 A1 | 7/2014 | Yamaguchi et al. | |
| 2016/0008918 A1 | 1/2016 | Burford | |
| 2016/0184922 A1 | 6/2016 | Kikyo | |
| 2016/0318120 A1 | 11/2016 | Okada et al. | |
| 2017/0225265 A1* | 8/2017 | Ito | B23K 20/1255 |
| 2019/0143442 A1 | 5/2019 | Ohashi et al. | |
| 2019/0262934 A1 | 8/2019 | Ohashi et al. | |
| 2019/0314927 A1 | 10/2019 | Ohashi et al. | |
| 2020/0016686 A1* | 1/2020 | Werz | B23K 20/1265 |
| 2020/0276666 A1* | 9/2020 | Haruna | B23K 20/1245 |
| 2020/0282491 A1* | 9/2020 | Haruna | B23K 20/1265 |
| 2021/0023649 A1 | 1/2021 | Muramatsu et al. | |
| 2021/0316391 A1* | 10/2021 | Miyake | B23K 20/1255 |
| 2021/0331421 A1* | 10/2021 | Okada | B29C 66/8322 |
| 2021/0339337 A1 | 11/2021 | Takeoka et al. | |
| 2022/0362889 A1* | 11/2022 | Ohashi | B23K 20/2333 |
| 2023/0211434 A1* | 7/2023 | Muramatsu | B23K 20/1255 228/2.1 |
| 2024/0261889 A1* | 8/2024 | Miyawaki | B23K 20/12 |
| 2024/0351133 A1* | 10/2024 | Yamagishi | C22C 38/002 |
| 2025/0065438 A1* | 2/2025 | Yamagishi | B32B 7/05 |

FOREIGN PATENT DOCUMENTS

| | | | | |
|---|---|---|---|---|
| CN | 104646820 A | | 5/2015 | |
| CN | 103934584 B | * | 3/2016 | ........... B23K 20/122 |
| CN | 105728933 A | | 7/2016 | |
| CN | 106994554 A | | 8/2017 | |
| CN | 107042359 A | | 8/2017 | |
| CN | 107921574 A | | 4/2018 | |
| CN | 108136537 A | * | 6/2018 | ............ B23K 20/12 |
| DE | 602 06 893 T2 | | 7/2006 | |
| DE | 10 2015 122 412 A1 | | 6/2016 | |
| EP | 1281468 A2 | | 2/2003 | |
| EP | 1557233 A2 | | 7/2005 | |
| EP | 1563943 A1 | | 8/2005 | |
| EP | 1902810 A1 | | 3/2008 | |
| EP | 2072174 A1 | | 6/2009 | |
| JP | 2004074238 A | | 3/2004 | |
| JP | 2006021217 A | | 1/2006 | |
| JP | 2008-073694 A | | 4/2008 | |
| JP | 2009-202828 A | | 9/2009 | |
| JP | 5854451 B2 | | 2/2016 | |
| JP | 2017077576 A | | 4/2017 | |
| JP | 2017196649 A | | 11/2017 | |
| JP | 2018-020359 A | | 2/2018 | |
| WO | WO-0183153 A1 | * | 11/2001 | ......... B23K 20/1255 |
| WO | 03033198 A1 | | 4/2003 | |
| WO | 03035320 A1 | | 5/2003 | |
| WO | WO-2005042208 A2 | * | 5/2005 | ........... B23K 20/126 |
| WO | 2007067659 A2 | | 6/2007 | |
| WO | 2011070749 A1 | | 6/2011 | |
| WO | 2015097727 A1 | | 7/2015 | |
| WO | 2018079806 A1 | | 5/2018 | |
| WO | WO-2019049814 A1 | * | 3/2019 | ........... B23K 20/127 |
| WO | 2019064849 A1 | | 4/2019 | |
| WO | 2019150620 A1 | | 8/2019 | |
| WO | 2019159930 A1 | | 8/2019 | |
| WO | 2019181800 A1 | | 9/2019 | |
| WO | 2019193778 A1 | | 10/2019 | |
| WO | 2019202748 A1 | | 10/2019 | |
| WO | 2020044663 A1 | | 3/2020 | |
| WO | 2020129281 A1 | | 6/2020 | |

* cited by examiner

| EXAMPLE TEST | TOOL SHAPE | ROTATIONAL SPEED | PRESSING FORCE | 1ST POSITION | JOINING TIME | PRESS-IN TEMP | FORMING OF ANCHOR PART |
|---|---|---|---|---|---|---|---|
| EXAMPLE TEST 1 | EMBODIMENT 1 | 750rpm | 24500N | 2.58mm | 4.2 SEC | 522°C | ○ |
| EXAMPLE TEST 2 | EMBODIMENT 1 | 1500rpm | 16660N | 2.52mm | 13.6 SEC | 607°C | × |
| EXAMPLE TEST 3 | EMBODIMENT 2 | 1500rpm | 16660N | 2.70mm | 4.8 SEC | 514°C | ○ |
| EXAMPLE TEST 4 | EMBODIMENT 2 | 1500rpm | 16660N | 2.49mm | 4.6 SEC | 507°C | ○ |
| EXAMPLE TEST 5 | EMBODIMENT 2 | 2000rpm | 9800N | 2.64mm | 14.3 SEC | 677°C | × |
| EXAMPLE TEST 6 | EMBODIMENT 2 | 1000rpm | 16660N | 2.70mm | 5.9 SEC | 512°C | ○ |
| EXAMPLE TEST 7 | EMBODIMENT 2 | 800rpm | 14700N | 2.90mm | 10.9 SEC | 562°C | ○ |

1ST POSITION: DISTANCE FROM UPPER SURFACE OF 1ST MEMBER

JOINING TIME: TIME REQUIRED FOR TIP END OF TOOL REACHING AT 1ST POSITION AFTER IT CONTACTED TO-BE-JOINED OBJECT

PRESS-IN TEMP: TEMPERATURE OF JOINED PART DETECTED BY TEMPERATURE DETECTOR WHEN TIP END OF TOOL IS PRESSED INTO 3RD MEMBER

FIG. 6

FRICTION STIR JOINING DEVICE, METHOD OF OPERATING THE SAME AND JOINT STRUCTURE

The present application is a divisional of U.S. application Ser. No. 17/282,634, filed on Apr. 2, 2021, which is a 371 of PCT/JP2019/040048, filed on Oct. 10, 2019, which claims priority to Japanese Application No. 2018-192520, filed on Oct. 11, 2018, the entire contents of each of which are incorporated herein by reference.

TECHNICAL FIELD

The present disclosure relates to a friction stir joining device, a method of operating the same, and a joint structure.

BACKGROUND ART

A method of manufacturing a vehicle body comprised of steel plate members and light metal plate materials having a lighter specific gravity than the steel plate members is known (for example, refers to Patent Document 1). A method of manufacturing a vehicle body disclosed in Patent Document 1 includes a first joining process for joining a light metal plate material and a steel plate material by overlapping the light metal plate material and the steel plate material with each other, and locally softening the light metal plate material and causing a plastic flow thereof by frictional heat of a rotary tool being pressed from the light metal plate material side, and a second joining process for overlapping the light metal plate material and the steel plate material which are joined at the first joining process, with two or more steel plate materials, and joining them at two or more locations by electric resistance spot welding.

REFERENCE DOCUMENT OF CONVENTIONAL ART

Patent Document

[Patent Document 1] JP2009-202828A

DESCRIPTION OF THE DISCLOSURE

Problem(s) to be Solved by the Disclosure

The present inventors have reached a friction stir joining device and a method of operating the same capable of joining three members, which are different from the method of manufacturing the vehicle body disclosed in Patent Document 1. One purpose of the present disclosure is to provide the friction stir joining device and the method of operating the same, which are provided with a novel configuration. Another purpose of the present disclosure is to provide a joint structure having a different configuration from an object (vehicle body) joined by the method of manufacturing the vehicle body disclosed in Patent Document 1.

SUMMARY OF THE DISCLOSURE

In order to solve the above problem, a friction stir joining device according to one aspect of the present disclosure joins a to-be-joined object having a first member, a second member, and a third member. The friction stir joining device includes a tool formed in a cylindrical shape and configured to be rotatable on an axis and reciprocatable in a direction along the axis, a rotary driver configured to rotate the tool on the axis, a linear-movement driver configured to reciprocate the tool along the axis, and a control device. The second member and the third member have melting points higher than the first member. The third member has hardness higher than the second member. The control device is adapted to (A) dispose the to-be-joined object so that the first member opposes to the tool, and the first member, the second member, and the third member are located in this order, (B) control the linear-movement driver and the rotary driver so that a tip-end part of the tool presses a joined part of the to-be-joined object while the tool is rotated, (C) control the linear-movement driver and the rotary driver so that the third member softened extends above an upper surface of the second member, and the tip-end part of the tool reaches a given first position set in advance, and (D) control the linear-movement driver and the rotary driver so that the tool is drawn out from the joined part while the tool is rotated.

Thus, the to-be-joined object comprised of the three members can fully be joined.

Moreover, according to another aspect of the present disclosure, a method of operating a friction stir joining device configured to join a to-be-joined object having a first member, a second member, and a third member, is provided. The friction stir joining device includes a tool formed in a cylindrical shape and configured to be rotatable on an axis and reciprocatable in a direction along the axis, a rotary driver configured to rotate the tool on the axis, and a linear-movement driver configured to reciprocate the tool along the axis. The second member and the third member have melting points higher than the first member. The third member has a hardness higher than the second member. The method includes the steps of (A) disposing the to-be-joined object so that the first member opposes to the tool, and the first member, the second member, and the third member are located in this order, (B) operating the linear-movement driver and the rotary driver so that a tip-end part of the tool presses a joined part of the to-be-joined object while the tool is rotated, (C) operating the linear-movement driver and the rotary driver so that the third member softened extends above an upper surface of the second member, and the tip-end part of the tool reaches a given first position set in advance, and (D) operating the linear-movement driver and the rotary driver so that the tool is drawn out from the joined part while the tool is rotated.

Thus, the to-be-joined object comprised of the three members can fully be joined.

Moreover, according to another aspect of the present disclosure, a joint structure formed by joining a to-be-joined object having a first member, a second member, and a third member, at a joined part is provided. The second member and the third member have melting points higher than the first member. The third member has a material hardness higher than the first member and the second member. The first member, the second member, and the third member are disposed so as to be located in this order. The joined part is formed so that a material derived from the third member extends above an upper surface of the second member.

According to the joint structure of the present disclosure, an anchor part is formed by the material derived from the third member extending above the upper surface of the second member. By this anchor part, an anchor effect in which the tensile-shear strength increases and the peel strength also relatively increases can be acquired. Therefore, the to-be-joined object comprised of the three members can fully be joined, and the strong joint structure can be provided.

The above purpose, other purposes, features, and advantages of the present disclosure will be made clear from the following detailed description of suitable embodiments with reference to the accompanying drawings.

Effect of the Disclosure

According to the friction stir joining device and the method of operating the same of the present disclosure, the to-be-joined object comprised of the three members can fully be joined. Moreover, according to the joint structure of the present disclosure, the strong joint structure can be provided by fully joining the to-be-joined object comprised of the three members.

BRIEF DESCRIPTION OF DRAWINGS

FIG. 6 is a table illustrating conditions of the friction stir joining of a to-be-joined object W by the friction stir joining device according to Embodiment 1 or 2.

MODES FOR CARRYING OUT THE DISCLOSURE

Figure 1:
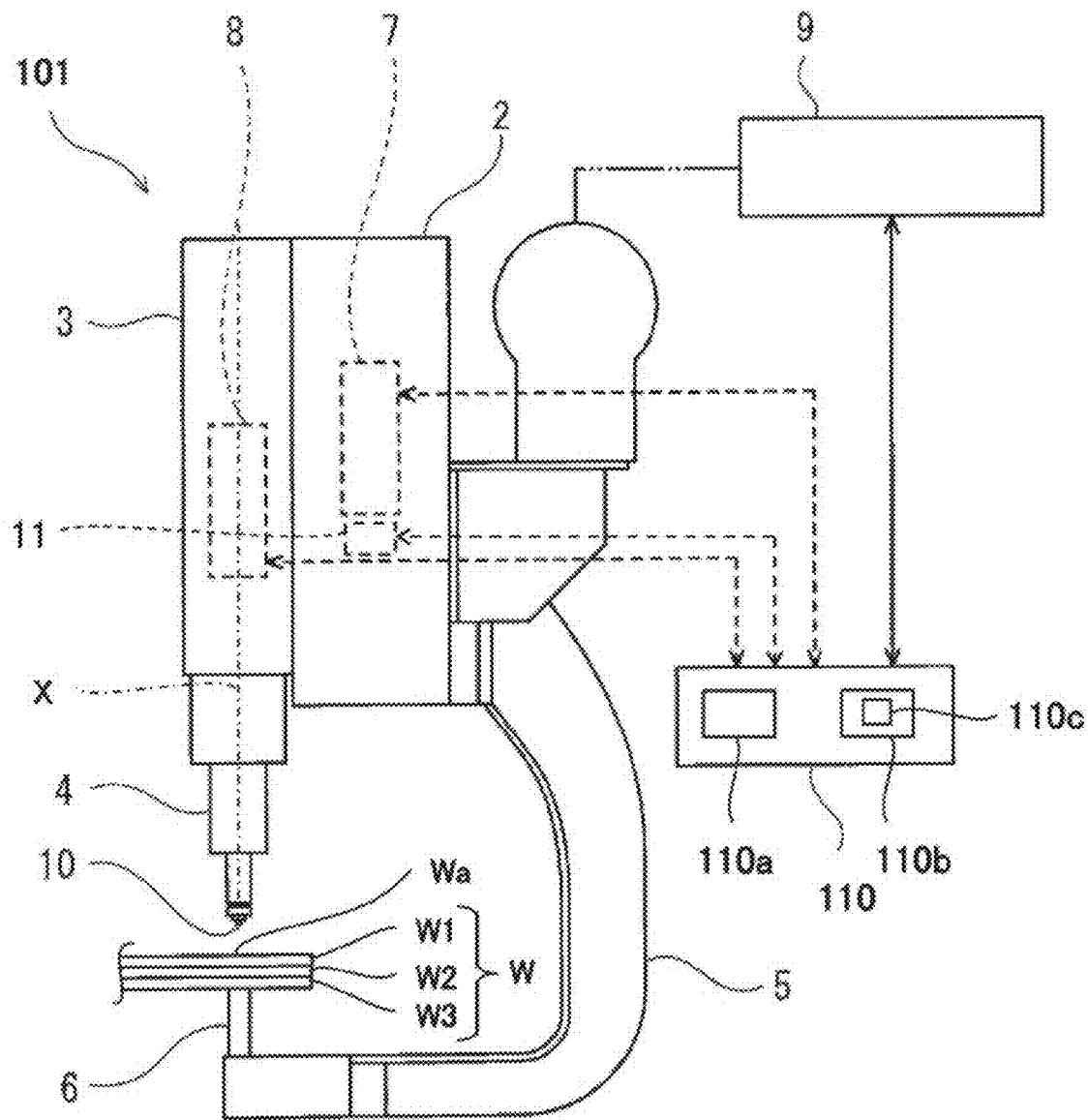
FIG. 1 is a schematic view illustrating an outline configuration of a friction stir joining device according to Embodiment 1.

Hereinafter, desirable embodiments of the present disclosure will be described with reference to the drawings. Note that, below, the same reference characters are assigned to the same or corresponding elements throughout the drawings to omit redundant description. Moreover, throughout the drawings, components which are needed to describe the present disclosure are selectively illustrated, and illustration of other components may be omitted. Moreover, the present disclosure is not limited to the following embodiments.

Embodiment 1

A friction stir joining device according to Embodiment 1 is a friction stir joining device which joins an object to be joined having a first member, a second member, and a third member. The friction stir joining device includes a tool which is formed in a cylindrical shape and is configured so that rotation on an axis and a reciprocating movement in a direction along the axis are possible, a rotary driver which rotates the tool on the axis, a linear-movement driver which reciprocates the tool along the axis, and a control device. The second member and the third member are configured so that their melting points are higher than the first member. The third member is configured so that the hardness becomes higher than the second member. The control device is adapted to (A) dispose the to-be-joined object so that the first member opposes to the tool and the first member, the second member, and the third member are located in this order, (B) control the linear-movement driver and the rotary driver so that a tip-end part of the tool presses a joined part of the to-be-joined object while the tool is rotated, (C) control the linear-movement driver and the rotary driver so that the softened third member extends above the upper surface of the second member and the tip-end part of the tool reaches a given first position set in advance, and (D) control the linear-movement driver and the rotary driver so that the tool is drawn out from the joined part while the tool is rotated.

Moreover, in the friction stir joining device according to Embodiment 1, the control device may control the linear-movement driver and the rotary driver in (C) so that the tip-end part of the tool reaches the first position within a given first period set in advance.

Hereinafter, one example of the friction stir joining device according to Embodiment 1 is described in detail with reference to FIGS. 1 to 3.

[Configuration of Friction Stir Joining Device]

FIG. 1 is a schematic view illustrating an outline configuration of the friction stir joining device according to Embodiment 1.

As illustrated in FIG. 1, the friction stir joining device 101 according to Embodiment 1 includes a tool 10, a base 2, a movable body 3, a tool holder 4, a linear-movement driver 7, a rotary driver 8, a position detector 11, and a control device 110. The friction stir joining device 101 softens a joined part Wa of an to-be-joined object W having a first member W1, a second member W2, and a third member W3 by frictional heat to cause a plastic flow, and joins the to-be-joined object W.

The to-be-joined object W is configured so that melting points of the second member W2 and the third member W3 are higher than the first member W1, and hardness of the third member W3 is higher than the second member W2. The first member W1, the second member W2, and the third member W3 are formed in a plate shape in Embodiment 1.

The first member W1 may be made of metal (for example, aluminum or magnesium) or fiber-reinforced plastic (for example, carbon fiber reinforced plastic). Moreover, the second member W2 is made of, for example, metal, and may be made of steel (mild steel) or aluminum. Moreover, the third member W3 is made of metal, and may be made of steel (mild steel or high-tensile steel). Moreover, in the to-be-joined object W, the first member W1 may be made of magnesium or fiber-reinforced plastic, the second member W2 may be made of aluminum, and the third member W3 may be made of steel (mild steel or high-tensile steel).

Note that, although in Embodiment 1 the to-be-joined object W is comprised of the plate-shape first member W1, second member W2, and third member W3, it is not limited to this configuration, and the shape of the to-be-joined object W (the first member W1, the second member W2, and the third member W3) are arbitrary, and, for example, it may be a rectangular parallelepiped shape, or may be formed in an arc shape.

The base 2 is detachably attached to a tip-end part of a robot 9. Note that, as the robot 9, robots, such as horizontal articulated and vertical articulated robots, can be adopted. Moreover, in Embodiment 1, although the base 2 is attached to the robot 9, it is not limited to this configuration, and it may be fixed to a suitable location.

The movable body 3 is attached to the base 2 so as to be movable in an axis X direction of the tool holder 4. The tool holder 4 is provided to a tip-end part of the movable body 3.

The tool holder 4 is rotatable on the axis X, and is configured to be movable in the axis X direction, integrally with the movable body 3. The tool 10 is detachably provided to a tip-end part of the tool holder 4. Note that the attachment and detachment (replacement) of the tool 10 may be performed by a worker, or may be performed by a robot different from the robot 9.

Moreover, the linear-movement driver 7 is disposed inside the base 2. The linear-movement driver 7 is configured so as to linearly move the movable body 3 (tool 10) in the axis X direction. For example, as the linear-movement driver 7, an electric motor (servomotor) and a ball screw or a linear guide may be used, or an air cylinder may be used.

The rotary driver 8 is disposed inside the movable body 3. The rotary driver 8 is configured so as to rotate the tool holder 4 and the tool 10 on the axis X. For example, as the rotary driver 8, an electric motor (servomotor) may be used.

Moreover, a curved frame 5 formed in a substantially C-shape (substantially L-shape) is fixed to the base 2. The curved frame 5 is formed so that a tip-end part thereof opposes to the tool 10. Moreover, a support table 6 is provided to a tip-end part of the curved frame 5. The support table 6 is configured so as to support the to-be-joined object W. That is, in Embodiment 1, the base 2, the movable body 3, the tool holder 4, the curved frame 5, and the support table 6 are configured to be a C-shaped gun (C-shaped frame).

The control device 110 includes a processor 110a such as a microprocessor and a CPU, and a memory (storage device) 110b such as a ROM and a RAM. The memory 110b stores information on a basic program, various fixed data, etc. The processor 110a controls various operations of the friction stir joining device 101 and the robot 9 by reading and executing software, such as the basic program stored in the memory 110b.

Moreover, the memory 110b is comprised of a known memory, a hard disk drive, etc. The memory 110b does not need to be a sole memory, and may be configured as a plurality of storage devices (for example, a random-access memory and a hard disk drive).

Note that the control device 110 may be comprised of a sole control device 110 which carries out a centralized control, or may be comprised of a plurality of control devices 110 which collaboratively carry out a distributed control. Moreover, the control device 110 may be comprised of a microcomputer, or may be comprised of an MPU, a PLC (Programmable Logic Controller), a logic circuit, etc.

[Operation and Effects of Friction Stir Joining Device (Method of Operating Friction Stir Joining Device)]

Next, operation of (method of operating) the friction stir joining device 101 according to Embodiment 1 is described with reference to FIGS. 1 to 3. Note that the following operation is performed by the processor 110a of the control device 110 reading the program stored in the memory 110b.

Figure 2:
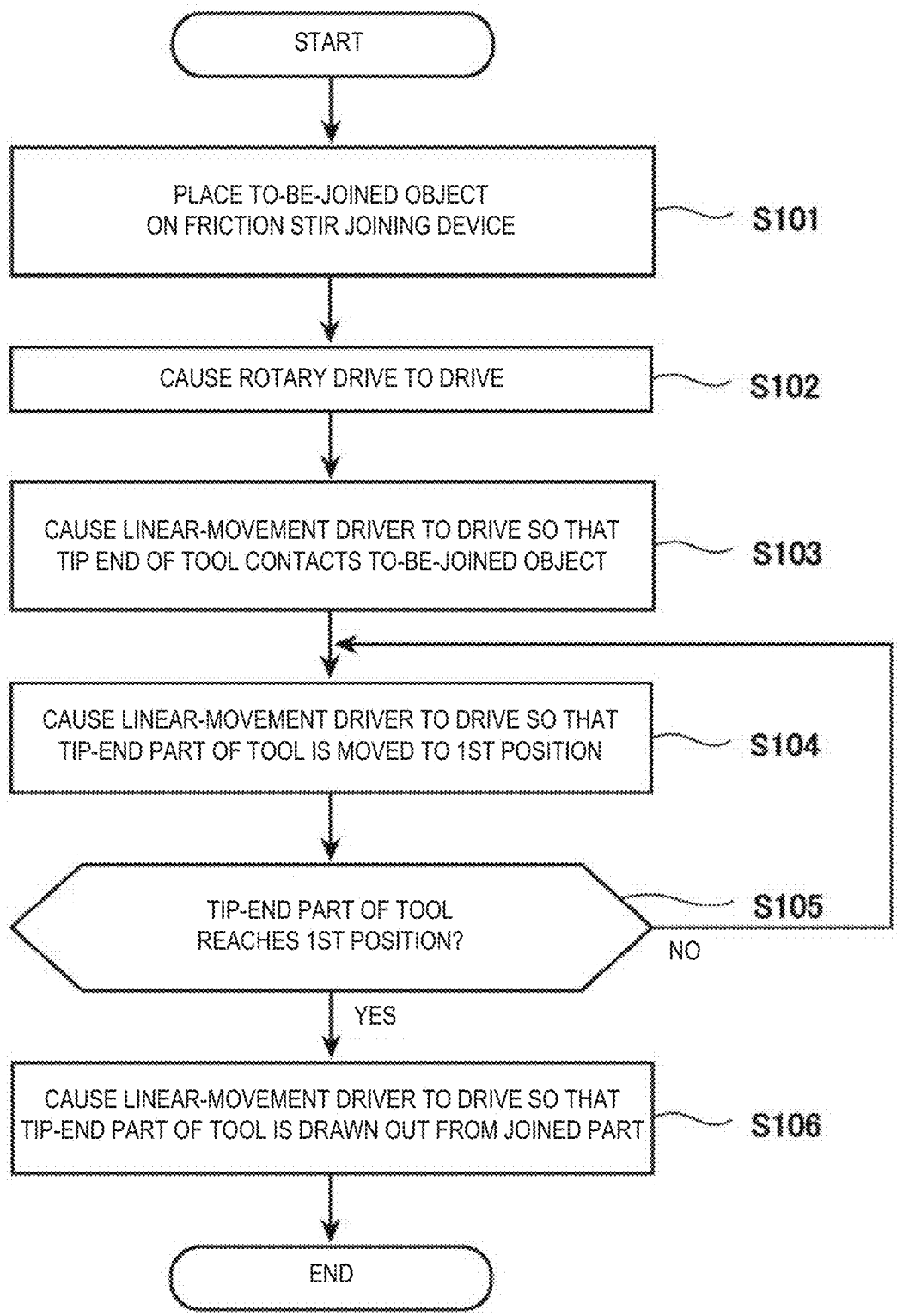
FIG. 2 is a flowchart illustrating one example of operation of the friction stir joining device according to Embodiment 1.

FIG. 2 is a flowchart illustrating one example of operation of the friction stir joining device according to Embodiment 1. FIG. 3 is a schematic view illustrating a substantial part of the friction stir joining device according to Embodiment 1, where a state of performing friction stir joining by the tool is illustrated.

First, suppose that the worker operates an input device (not illustrated) to input to the control device 110 an instruction information indicative of executing a joining of the to-be-joined object W.

Then, as illustrated in FIG. 2, the control device 110 causes the robot different from the robot 9 to convey the first member W1, the second member W2, and the third member W3, and place (dispose) the members on the support table 6 of the friction stir joining device 101 so that the first member W1 opposes to the tool 10, and the first member W1, the second member W2, and the third member W3 are located in this order (Step S101). Note that the worker may dispose the first member W1, the second member W2, and the third member W3 on the friction stir joining device 101.

Next, the control device 110 causes the rotary driver 8 to drive so that the tool 10 is rotated at a given rotational speed (for example, 500 to 3000 rpm) (Step S102). Then, the control device 110 causes the linear-movement driver 7 to drive while the tool 10 is rotated so that the tool 10 is advanced and the tip end of the tool 10 contacts the joined part Wa of the to-be-joined object W (Step S103).

Note that the joined part Wa of the to-be-joined object W is a part where the to-be-joined object W is joined, which refers to an area where the first member W1 to the third member W3 are softened by the rotation and the pressure of the tool 10.

Next, the control device 110 causes the linear-movement driver 7 to drive so that the tip-end part of the tool 10 is moved to the given first position set in advance within the given first period set in advance (Step S104). At this time, the control device 110 controls the linear-movement driver 7 so that the tool 10 presses the to-be-joined object W with a given pressing force set in advance (for example, 4 kN to 70 kN).

Note that the given rotational speed, the given pressing force, the first position, and the first period may be set suitably in advance by an experiment etc. and they are stored in the memory 110b as first data 110c. The first data 110c may be created based on the results of Example Tests 1 to 7 (described later).

Moreover, the positional information on the tip-end part of the tool 10 is detected by the position detector 11 and is outputted to the control device 110. For example, the position detector 11 may be an encoder provided to the linear-movement driver 7, or may be a detector which detects a moving amount of the tool 10.

Here, the first position is a position set arbitrarily between values larger than 0% and smaller than 100%, when a surface of the third member W3 contacting with the second member W2 is set as 0%, and a surface of the third member W3 contacting the backing member 6 is set as 100%.

Note that, in terms of improving the joining strength, the first position is desirably closer to the surface of the third member W3 contacting the backing member 6. It may be 25% or more, may be 50% or more, may be 75% or more, may be 80% or more, may be 90% or more, or may be 95% or more.

Moreover, in terms of forming an anchor part Ap (described later), the first period may be less than 10 seconds, may be less than 7 seconds, or may be less than 5 seconds.

Therefore, the tool 10 contacts the joined part Wa of the to-be-joined object W, frictional heat occurs by friction between the tip-end part of the tool 10 and the joined part Wa, the joined part Wa of the to-be-joined object W is softened, and the plastic flow occurs.

Figure 3:
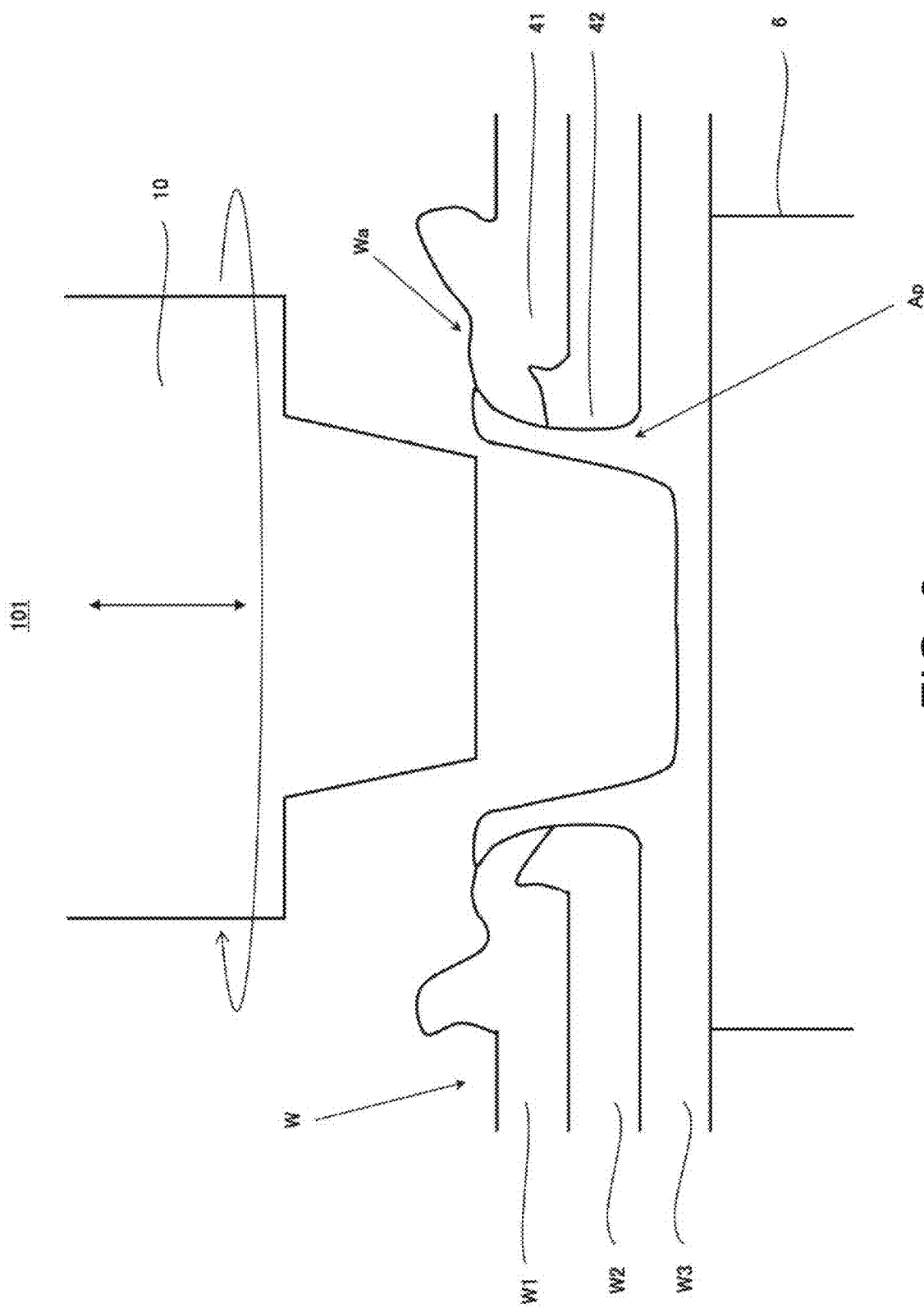
FIG. 3 is a schematic view illustrating a substantial part of the friction stir joining device according to Embodiment 1, where a state of performing a friction stir joining by a tool is illustrated.

Then, as illustrated in FIG. 3, by the tip-end part of the tool 10 being forced into the joined part Wa, a second softened part 42 which is a softened part of the third member W3 extends above an upper surface of the second member W2, and enters (pierces) into a first softened part 41 which is a softened part of the first member W1. Note that, herein, a part of the second softened part 42 extending above the upper surface of the second member W2 from a lower surface of the second member W2 is referred to as the anchor part Ap.

Next, the control device 110 determines whether the tip-end part of the tool 10 reaches the first position based on the positional information on the tip-end part of the tool 10 detected by the position detector 11 (Step S105). If the control device 110 determines that the tip-end part of the tool 10 does not reach the first position (No at Step S105), it performs processings at Steps S104 to S105 until the tip-end part of the tool 10 reaches the first position. On the other hand, if the control device 110 determines that the tip-end part of the tool 10 reaches the first position (Yes at Step S105), it performs processing at Step S106.

At Step S106, the control device 110 causes the linear-movement driver 7 to drive so that the tip-end part of the tool 10 is drawn out from the joined part Wa while the tool 10 is rotated. Then, when the tip-end part of the tool 10 is drawn out from the joined part Wa, the control device 110 stops the rotary driver 8 so that the rotation of the tool 10 is stopped, and ends the program. Note that, when joining a plurality of joined parts Wa, the control device 110 may start joining of the next joined part Wa, without stopping the rotation of the tool 10.

In the friction stir joining device 101 according to Embodiment 1 configured in this way, since the second softened part 42 of the third member W3 extends above the upper surface of the second member W2, the to-be-joined object which is comprised of the three members can fully be joined. Moreover, the anchor part Ap is formed, an anchor effect in which the tensile-shear strength increases and the peel strength also relatively increases can be acquired.

Moreover, the joined part Wa of the to-be-joined object W formed by the friction stir joining device 101 according to Embodiment 1 is one example of the joint structure according to Embodiment 1.

Note that, in the friction stir joining device 101 according to Embodiment 1, when the tip-end part of the tool 10 reaches the first position, although the control device 110 controls the linear-movement driver 7 so that the tip-end part of the tool 10 is drawn out from the joined part Wa, it is not limited to this configuration.

For example, when the tip-end part of the tool 10 reaches the first position, the control device 110 may operate the robot 9 so that the tool 10 is moved horizontally or the axis X of the tool 10 inclines, or may control the rotary driver 8 so that the rotating speed of the tool 10 increases. Thus, the softened part of the third member W3 can be increased, and the volume of the anchor part Ap can be increased. Therefore, a higher anchor effect can be obtained.

Moreover, as described above, although the joint structure according to Embodiment 1 is formed by the friction stir joining device 101 according to Embodiment 1, it is not limited to this configuration. In the joint structure according to Embodiment 1, the second member W2 and the third member W3 may be configured so that the melting point becomes higher than the first member W1, and the third member W3 may be configured so that the material hardness becomes higher than the first member W1 and the second member W2, the first member W1, the second member W2, and the third member W3 may be disposed so that they are located in this order, and the joined part Wa may be formed so that the material derived from the third member W3 extends above the upper surface of the second member W2. Therefore, the joint structure according to Embodiment 1 may be formed by friction stir joining devices other than the friction stir joining device 101 according to Embodiment 1, or may be formed by other instruments.

Moreover, in the joint structure according to Embodiment 1, the joined part Wa may be comprised of the first member W1 which is softened and hardened, the second member W2 which is softened and hardened, and the third member W3 which is softened and hardened. The softened and hardened third member W3 (material derived from the third member W3) may be formed so as to extend above the upper surface of the second member W2.

Embodiment 2

In the friction stir joining device according to Embodiment 1, a friction stir joining device according to Embodiment 2 is configured so that the tip-end part of the tool has a first tip-end part and a second tip-end part located on the base-end side of the first tip-end part, the first tip-end part and the second tip-end part are each formed in a truncated cone shape, and the first tip-end part is formed so that an area of a tip-end face thereof is smaller than an area of a tip-end face of the second tip-end part.

Below, one example of the friction stir joining device according to Embodiment 2 is described in detail with reference to FIG. 4.

[Configuration of Friction Stir Joining Device]

Figure 4:
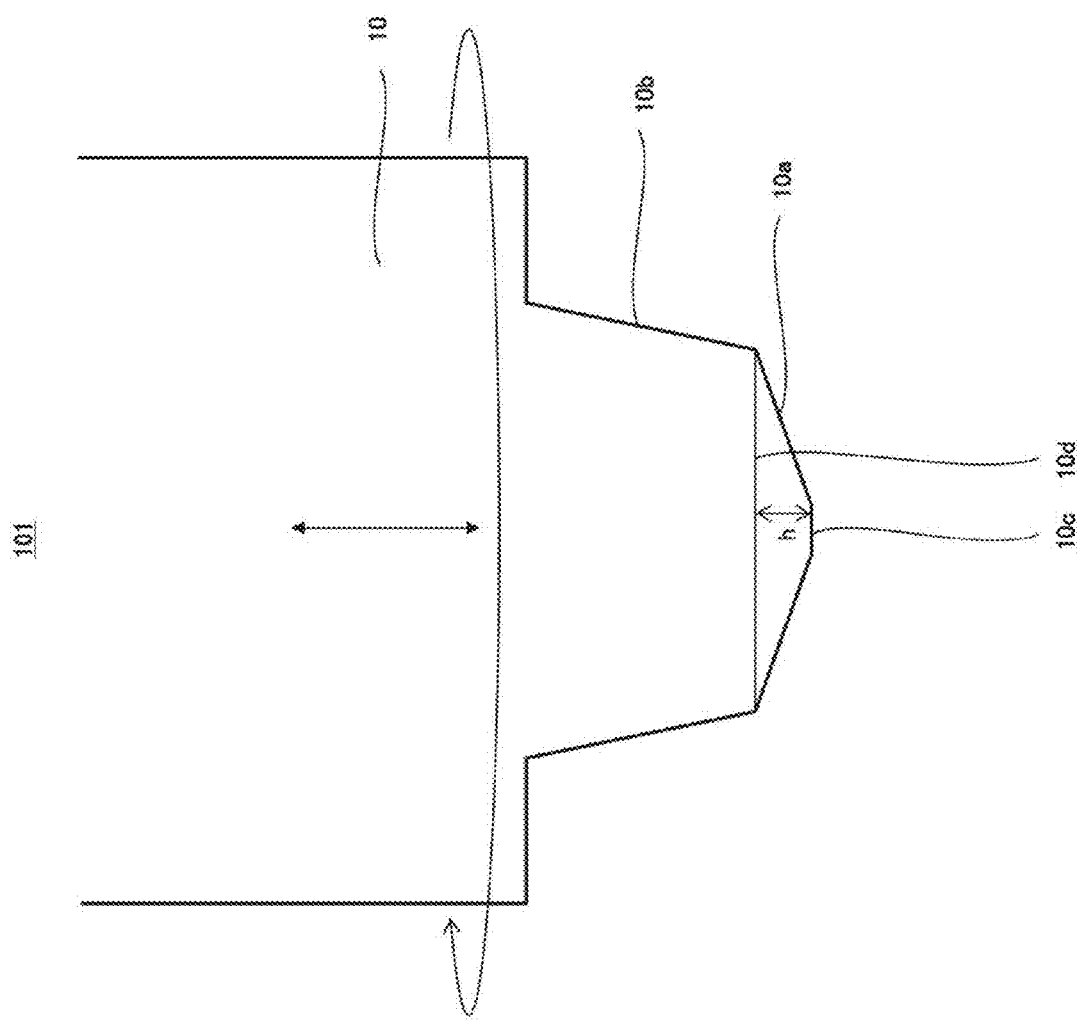
FIG. 4 is a schematic view illustrating an outline configuration of a tip-end part of a tool in a friction stir joining device according to Embodiment 2.

FIG. 4 is a schematic view illustrating an outline configuration of the tip-end part of the tool in the friction stir joining device according to Embodiment 2.

As illustrated in FIG. 4, the friction stir joining device 101 according to Embodiment 2 is the same in the fundamental configuration as the friction stir joining device 101 according to Embodiment 1, but a configuration of the tip-end part of the tool 10 is different.

In detail, the tip-end part of the tool 10 has a first tip-end part 10a and a second tip-end part 10b located on the base-end side of the first tip-end part 10a. The first tip-end part 10a and the second tip-end part 10b are each formed in a truncated cone shape.

Moreover, the area of a tip-end face 10c of the first tip-end part 10a is formed so as to be smaller than the area of a tip-end face 10d of the second tip-end part 10b. Note that the tip-end face 10d of the second tip-end part 10b is a surface on the boundary between the first tip-end part 10a and the second tip-end part 10b.

Moreover, in terms of further increasing the boring efficiency of the tool 10, the area of the tip-end face 10c on the first tip-end part 10a may be small. Moreover, if the area of the tip-end face 10c is small, a height h of the first tip-end part 10a (a length (distance) between the tip-end face 10c and the tip-end face 10d) may be small in terms of agitating the joined part Wa of the to-be-joined object W by the second tip-end part 10b. Thus, the volume pressed into the to-be-joined object W can be increased, and the anchor part Ap can be increased. Therefore, the joining strength of the joined part Wa of the to-be-joined object W can be increased.

Also the friction stir joining device 101 according to Embodiment 2 configured in this way can obtain similar operation and effects to the friction stir joining device 101 according to Embodiment 1. Note that the joined part Wa of the to-be-joined object W formed by the friction stir joining device 101 according to Embodiment 2 is one example of the joint structure according to Embodiment 2.

Moreover, in the friction stir joining device 101 according to Embodiment 2, the tip-end part of the tool 10 has the first tip-end part 10a and the second tip-end part 10b, and is formed so that the area of the tip-end face 10c of the first tip-end part 10a becomes smaller than the area of the tip-end face 10d of the second tip-end part 10b.

Thus, the friction stir joining device 101 according to Embodiment 2 can increase the boring efficiency of the tool 10, as compared with the friction stir joining device 101 according to Embodiment 1. Therefore, the tip end of the tool 10 can reach the first position in a shorter time, and the anchor part Ap is easier to be formed.

Example Tests

Next, example tests in which the friction stir joining of the to-be-joined object W is performed on variety of conditions by using the friction stir joining device 101 according to Embodiment 1 or 2 are described.

Meanwhile, in the present disclosure, it is necessary to make the height of the anchor part Ap illustrated in FIG. 3 larger than the height of the second member W2. Here, a relation between the height of the anchor part Ap and the height of the second member W2 is described using a schematic view illustrated in FIG. 5.

Figure 5:
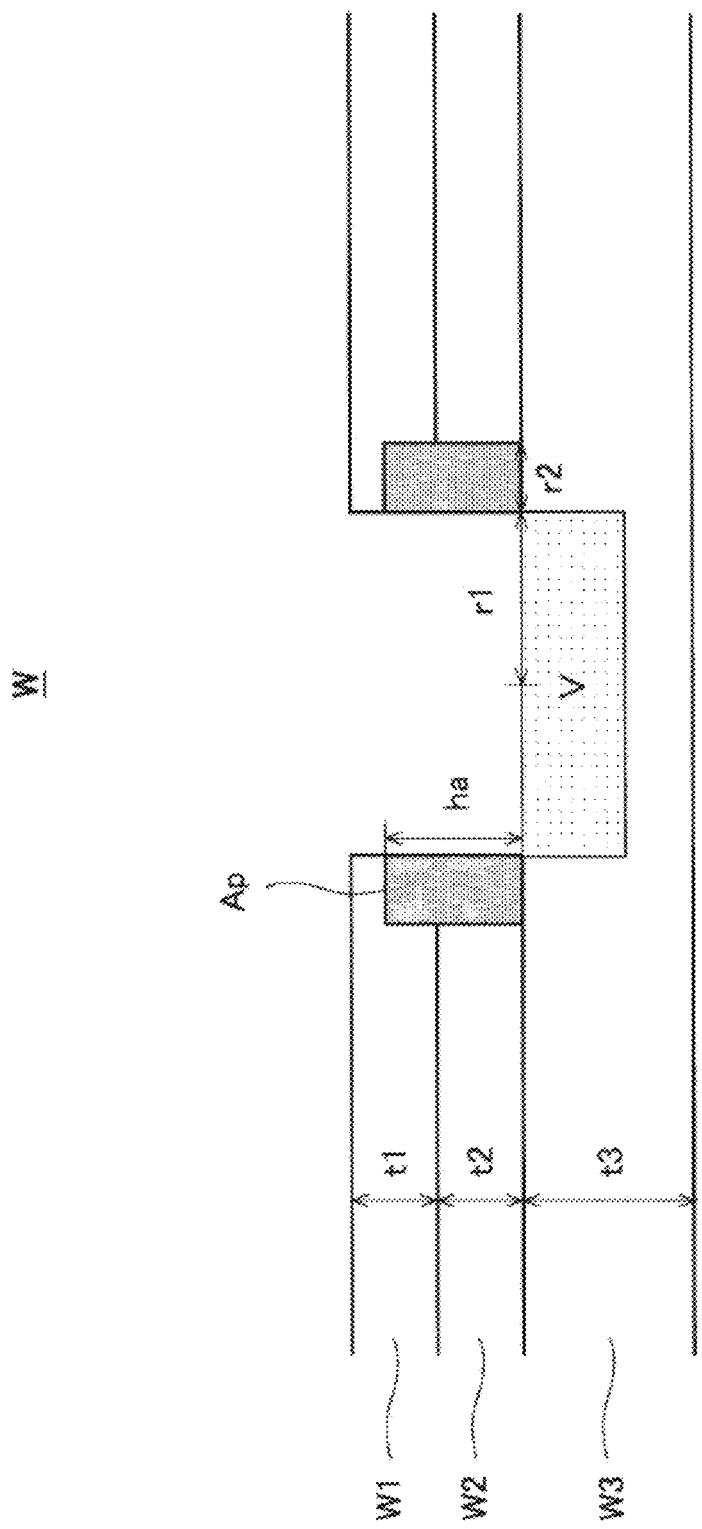
FIG. 5 is a schematic view illustrating a state where an object to be joined is joined by the friction stir joining device.
Figure 7:
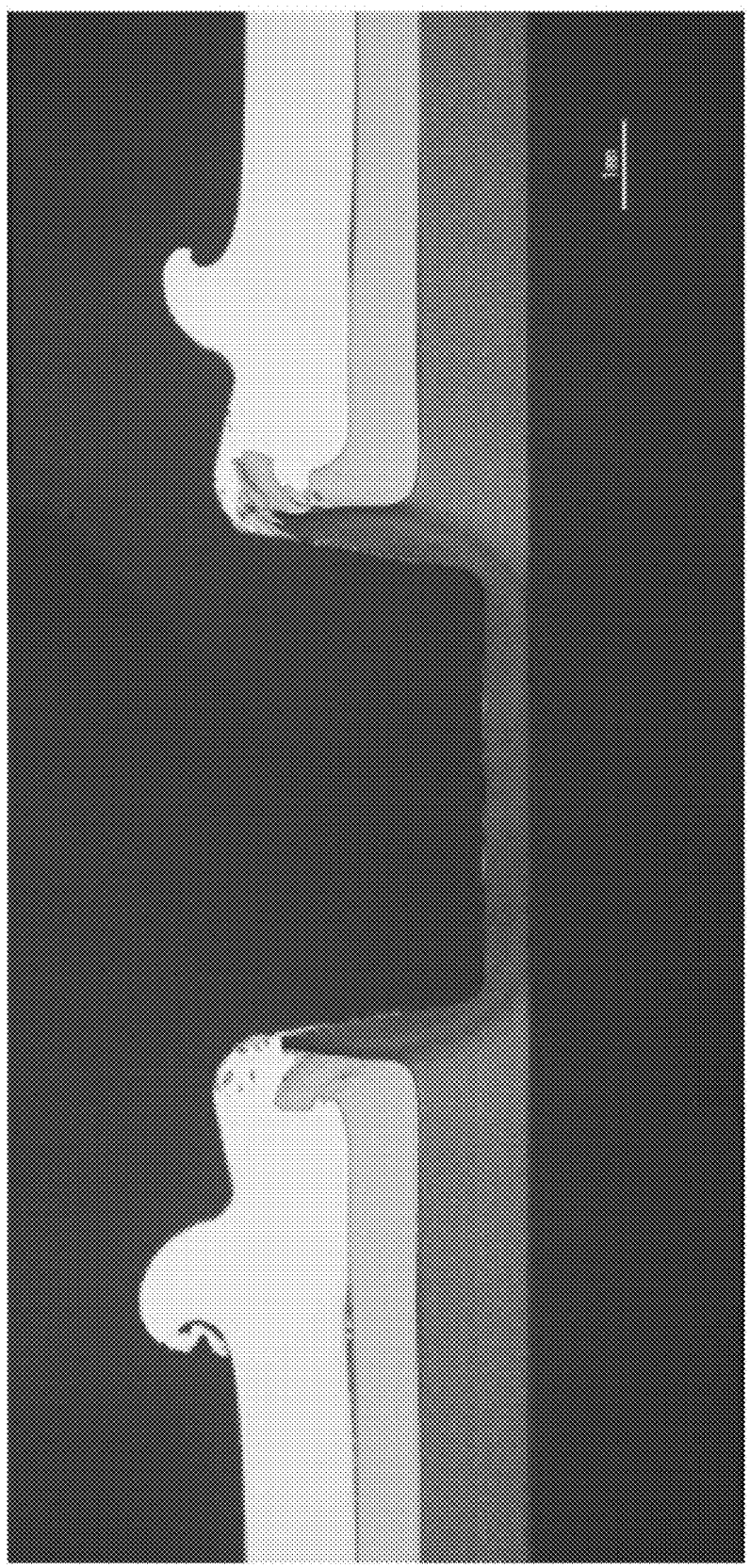
FIG. 7 is a photograph illustrating a result of friction stir joining of the to-be-joined object on condition of Example Test 1 illustrated in FIG. 6.
Figure 8:
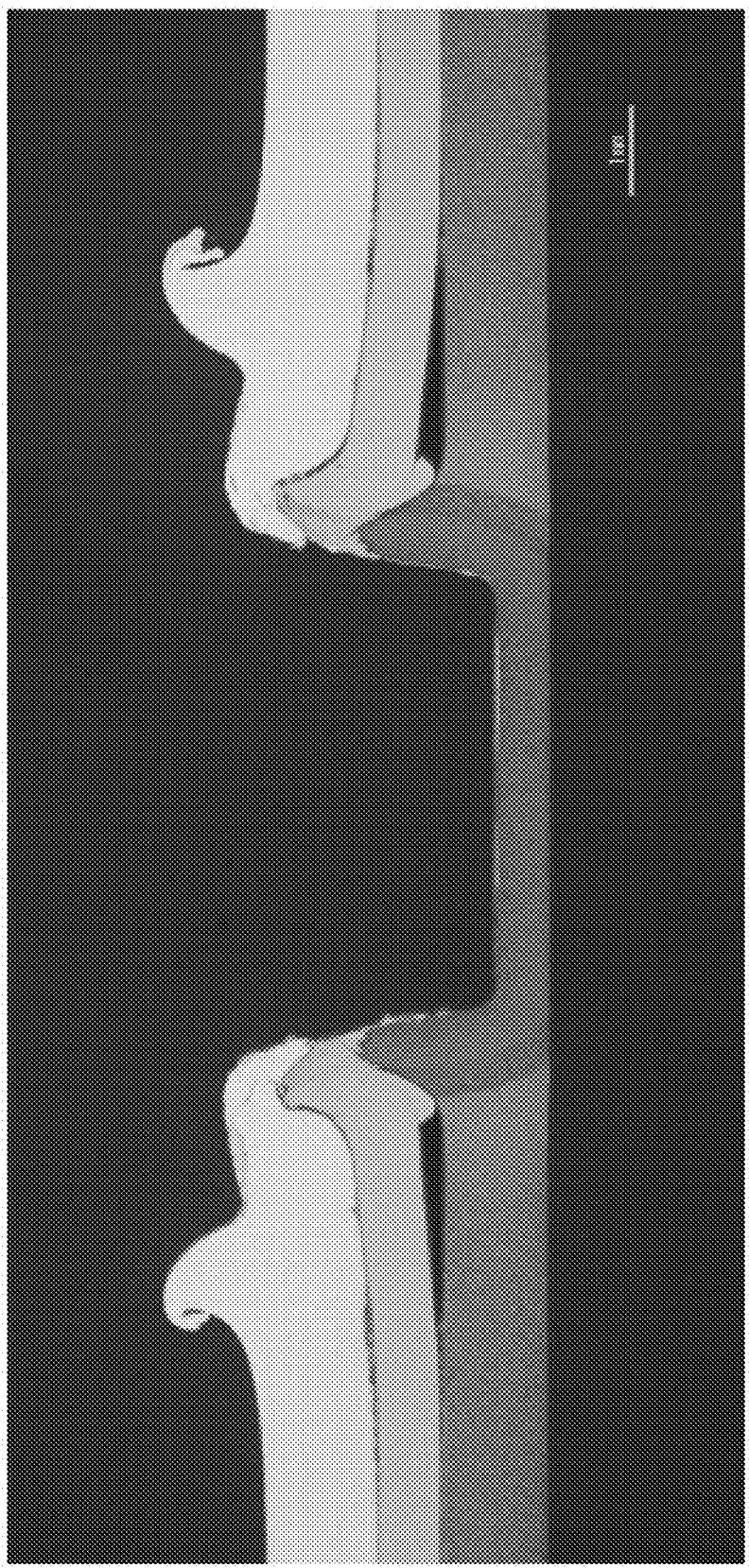
FIG. 8 is a photograph illustrating a result of friction stir joining of the to-be-joined object on condition of Example Test 2 illustrated in FIG. 6.
Figure 9:
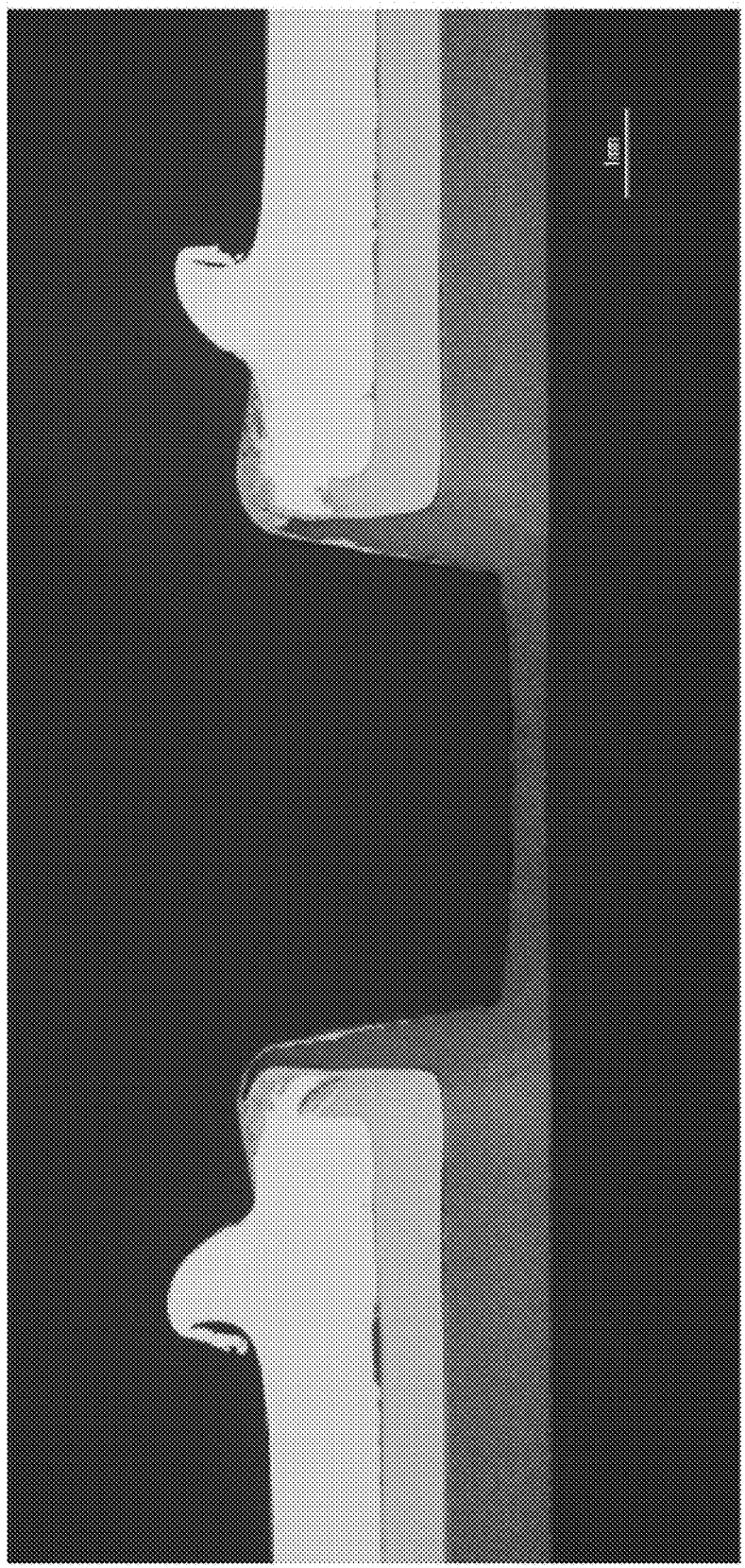
FIG. 9 is a photograph illustrating a result of friction stir joining of the to-be-joined object on condition of Example Test 3 illustrated in FIG. 6.
Figure 10:
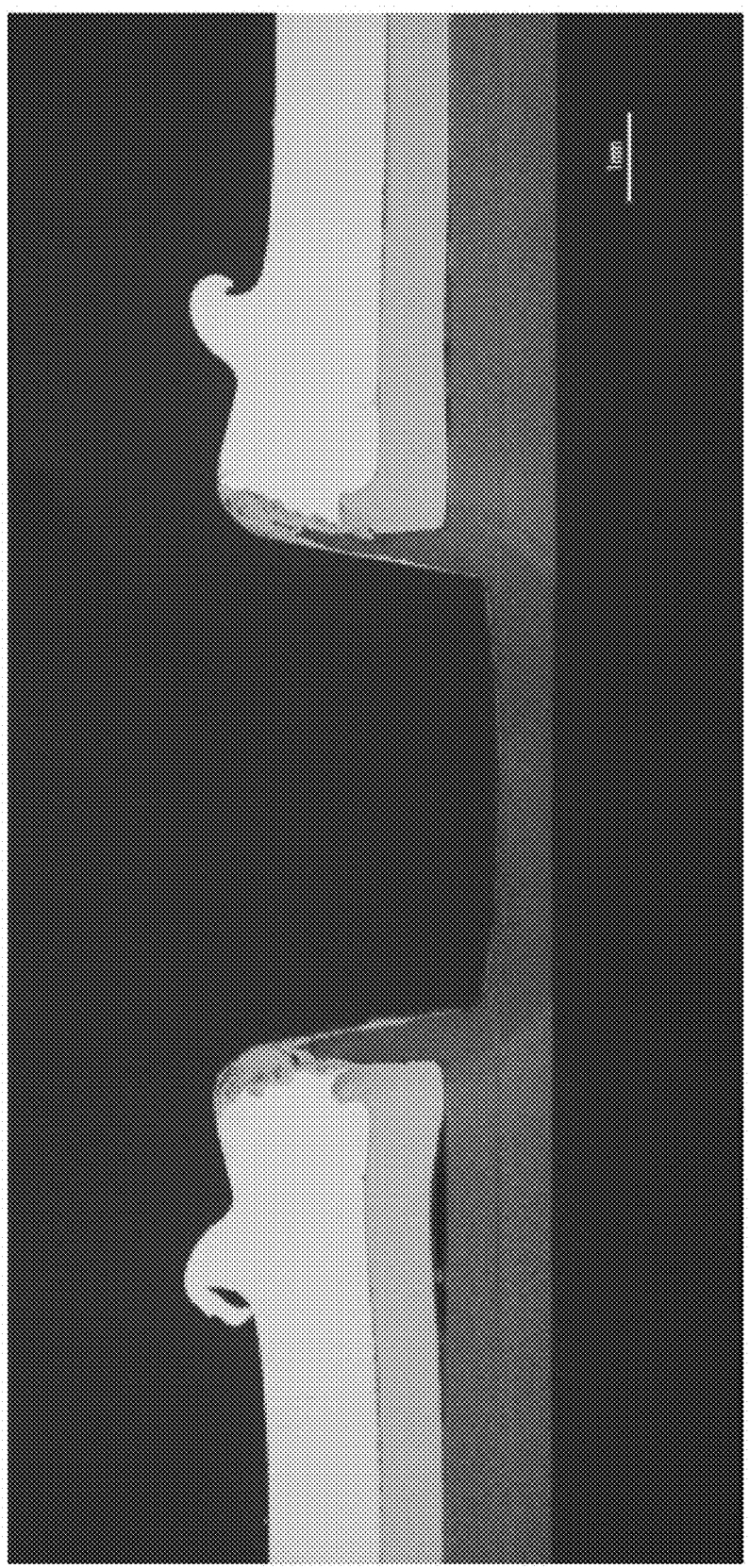
FIG. 10 is a photograph illustrating a result of friction stir joining of the to-be-joined object on condition of Example Test 4 illustrated in FIG. 6.
Figure 11:
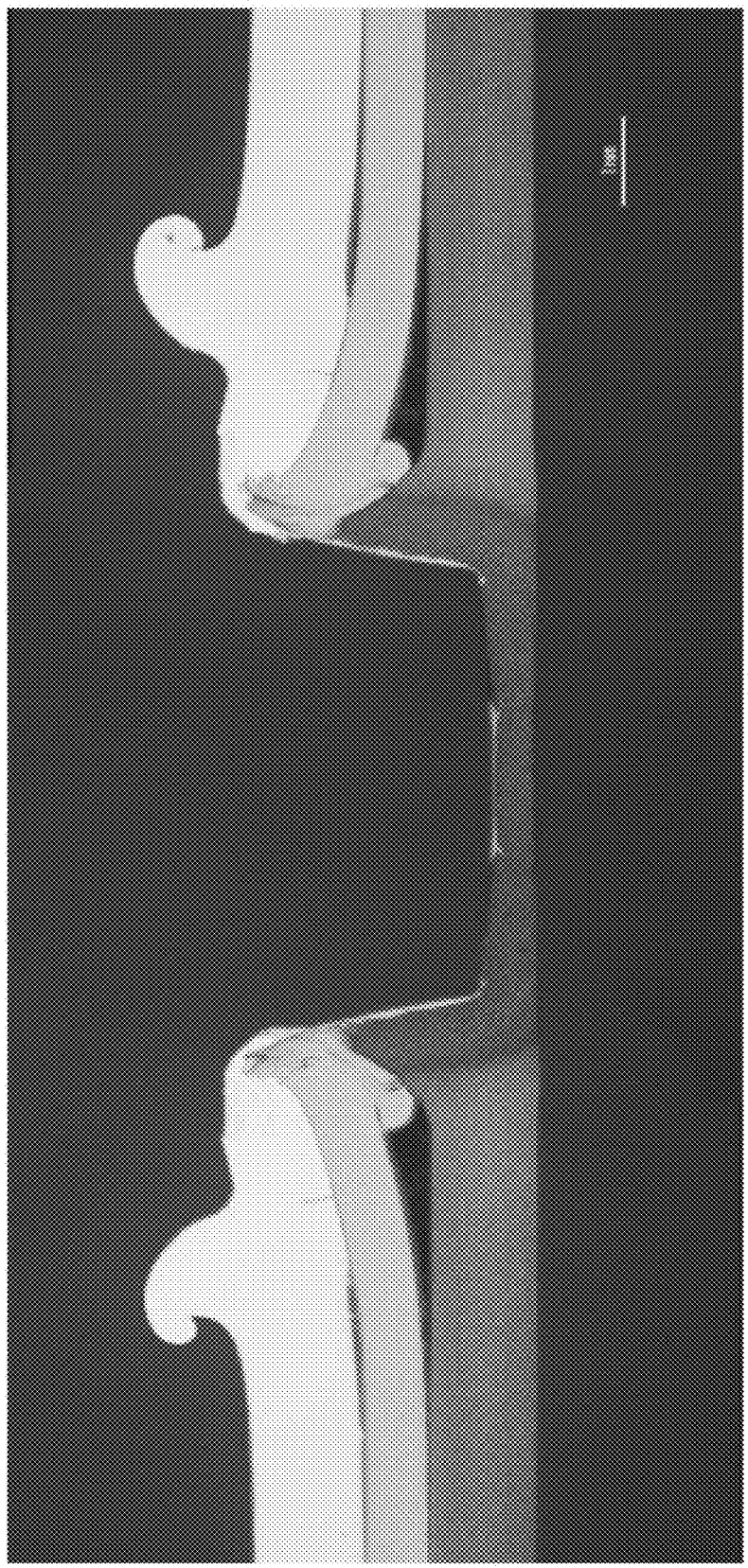
FIG. 11 is a photograph illustrating a result of friction stir joining of the to-be-joined object on condition of Example Test 5 illustrated in FIG. 6.
Figure 12:
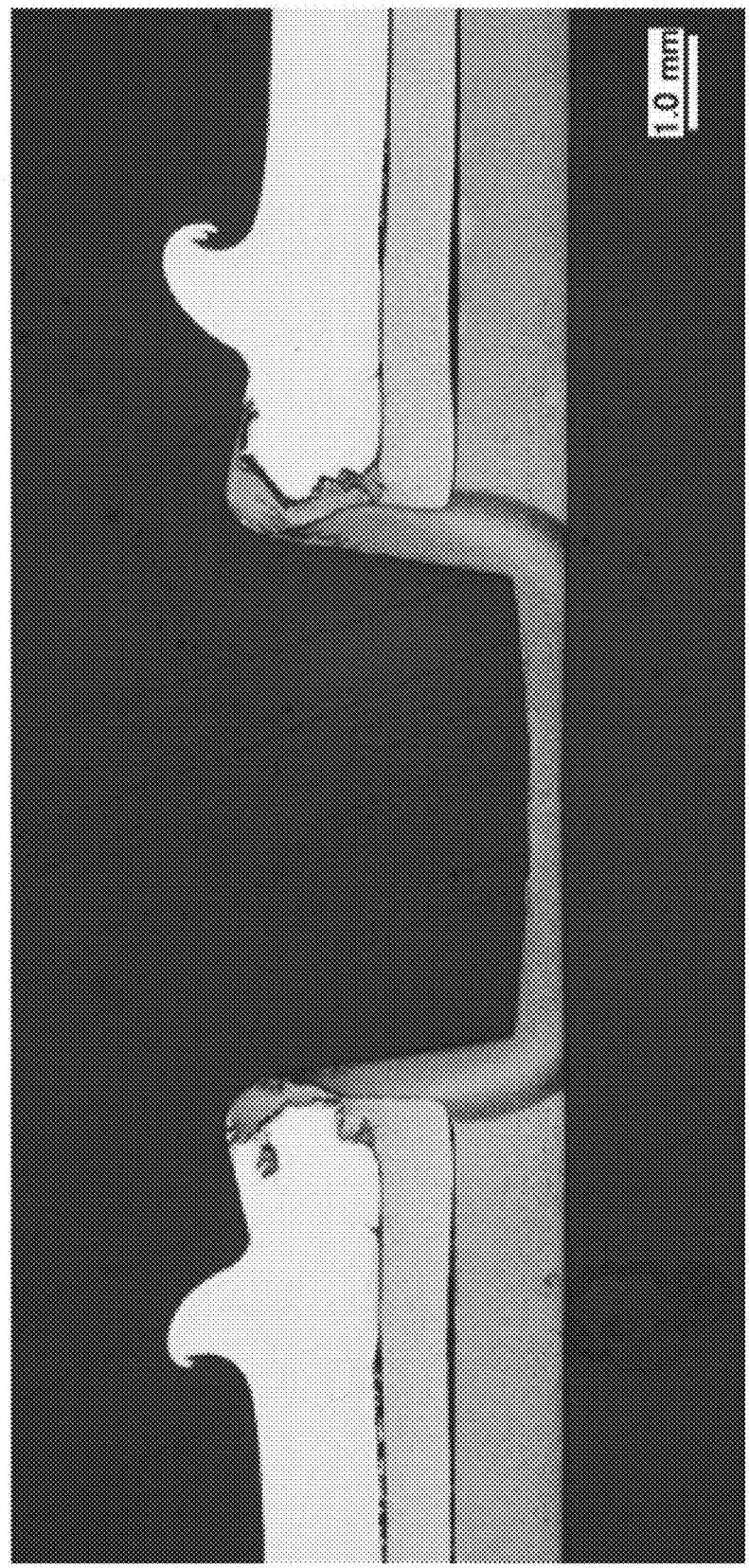
FIG. 12 is a photograph illustrating a result of friction stir joining of the to-be-joined object on condition of Example Test 6 illustrated in FIG. 6.
Figure 13:
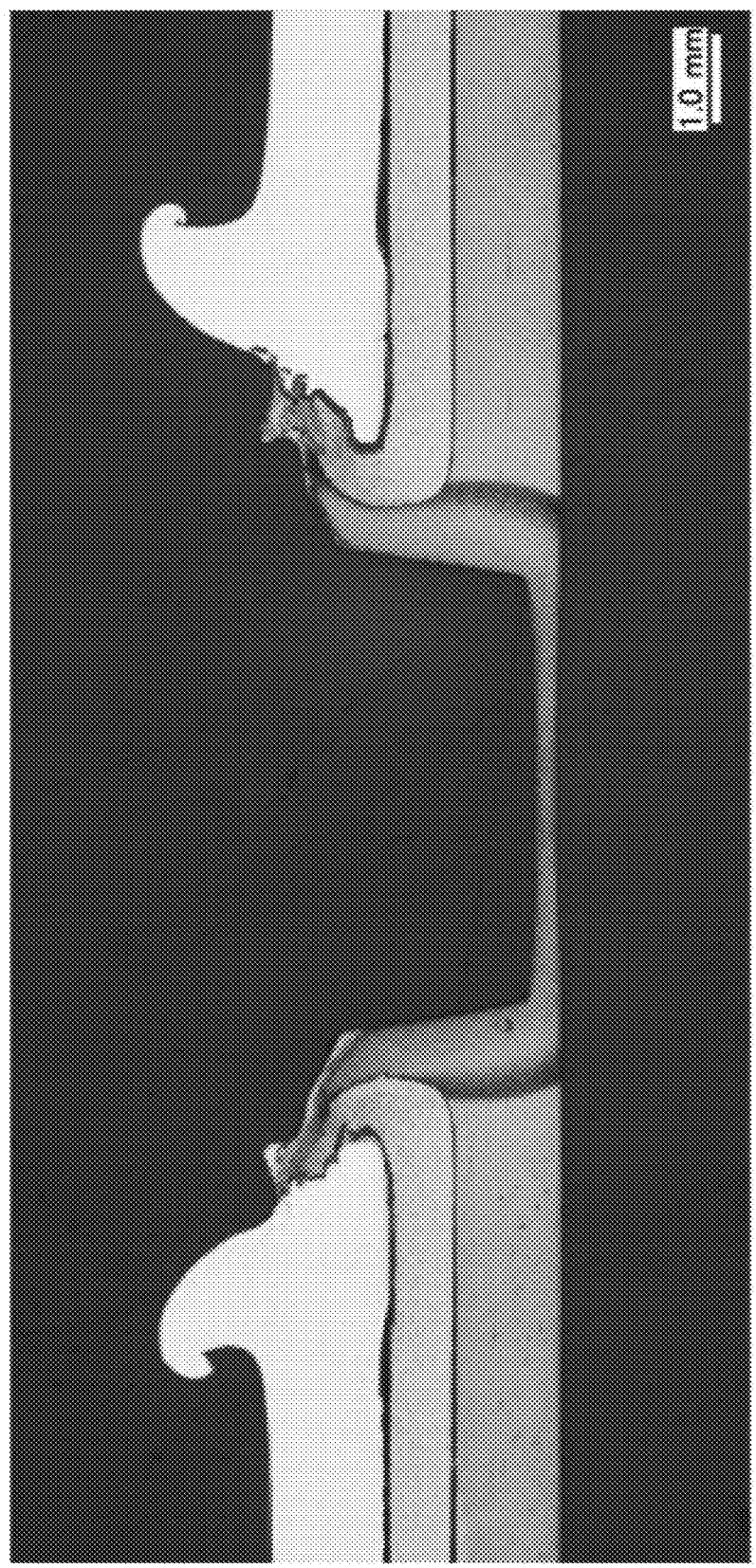
FIG. 13 is a photograph illustrating a result of friction stir joining of the to-be-joined object on condition of Example Test 7 illustrated in FIG. 6.

FIG. 5 is a schematic view illustrating a state where the to-be-joined object is joined by the friction stir joining device.

As illustrated in FIG. 5, suppose that a volume of the tip-end part of the tool 10 pressed into the third member W3 is V, a radius of a part of the tip-end part of the tool 10 which is horizontal to the upper surface of the third member W3 is r1, and a length (width) of a part of the anchor part Ap which is horizontal to the upper surface of the third member W3 is r2. Moreover, suppose that a thickness (height) of the first member W1 is t1, a thickness (height) of the second member W2 is t2, and a thickness (height) of the third member W3 is t3.

Then, as illustrated in FIG. 5, it is assumed that the anchor part Ap is formed in a cylindrical (circular cylindrical) shape, and the volume of the tip-end part of the tool 10 pressed into the third member W3 is equal to the volume of the anchor part Ap. Here, a height ha of the anchor part Ap satisfies a relation illustrated in (1).

$$\text{ha} = V/\pi\{(r1+r2)^2 - r1^2\} > t2 \quad (1)$$

Here, in (1), the volume V of the tip-end part of the tool 10 pressed into the third member W3 can be calculated based on the first position set in advance by the operator etc. Moreover, once the volume V is calculated, the radius r1 of the part of the tip-end part of the tool 10 which is horizontal to the upper surface of the third member W3 can also be calculated.

Therefore, in (1), by adjusting the length r2, the height ha of the anchor part Ap can be made larger than the height t2 of the second member W2. Thus, the present inventors indicated that the friction stir joining of the to-be-joined object W is performed under various conditions, and the length r2 of the part of the anchor part Ap which is horizontal to the upper surface of the third member W3 can be set in advance by an experiment. Below, concrete conditions are described.

Note that, in the following example tests, the friction stir joining device 101 is provided with a temperature detector which detects the temperature of the joined part W. Moreover, in the following example tests, an aluminum alloy plate (A5052) with the thickness of 1.2 mm is used as the first member W1, a galvanized sheet iron with the thickness of 0.7 mm (the original plate is a steel plate of 270 MPa-class) is used as the second member W2, and a 980 MPa-class steel plate with the thickness of 1.2 mm is used as the third member W3.

FIG. 6 is a table illustrating conditions of the friction stir joining of the to-be-joined object W by the friction stir joining device according to Embodiment 1 or 2. Moreover, FIGS. 7 to 13 are photographs illustrating results of the friction stir joining of the to-be-joined object under the conditions of Example Tests 1 to 7 illustrated in FIG. 6.

Note that, in FIG. 6, a case where the shape of the tip end of the tool 10 has the configuration of the friction stir joining device 101 according to Embodiment 1 is indicated as Embodiment 1, and a case where the shape has the configuration of the friction stir joining device 101 according to Embodiment 2 is indicated as Embodiment 2. The first position is expressed by a distance (mm) from the upper surface of the first member W1 of the to-be-joined object W.

Moreover, in FIG. 6, the joining time indicates a time required for the tip end of the tool 10 reaching at the first position after it contacted the to-be-joined object W (correctly, the upper surface of the first member W1). Moreover, the press-in temperature indicates a temperature of the joined part Wa detected by the temperature detector, when the tip end of the tool 10 reaches the upper surface of the third member W3 and is pressed into the third member W3.

As illustrated in FIGS. 6 to 13, when the joining time which is the time required for the tip end of the tool 10 actually reaching the first position was long, it was suggested that the anchor part Ap was not formed (see Example Tests 2 and 5). From these results, the first period which is the time required for the tip end of the tool 10 reaching the first position may be set 11 seconds or shorter, may be set 6 seconds or shorter, or may be set 5 seconds or shorter.

Moreover, when the press-in temperature of the joined part Wa becomes high, it is suggested that the anchor part Ap was not formed (see Example Tests 2 and 5). From these results, the present inventors speculated that, when the press-in temperature of the joined part Wa becomes high, the heat input into the joined part Wa increases and the softened parts of the first member W1, the second member W2, and the third member W3 spreads horizontally to reduce the height of the softened part of the third member W3, and therefore, the anchor part Ap cannot be formed.

Moreover, from the results of Example Tests 1 and 2 and the results of Example Tests 3 to 7, it was suggested that, when the rotating speed of the tool 10 increases, the press-in temperature of the joined part Wa tends to become higher, and when the pressing force of the tool 10 (the pressure of the tip-end part of the tool 10 pressing the joined part Wa) increases, the joining time becomes shorter (the press-in speed of the tool 10 increases).

Therefore, from the results illustrated in Example Tests 1 to 7, it was suggested that the anchor part Ap can be formed by setting the rotating speed (rotational speed) of the tool 10 and the pressing force in advance according to the temperature of the joined part Wa detected by the temperature detector.

Moreover, from the results illustrated in Example Tests 1 to 7, it was suggested that, even if the materials and the plate thicknesses of the first member W1 to the third member W3 which constitute the to-be-joined object W are changed, the first position, the first period, the rotational speed of the tool 10, and the pressing force which can form the anchor part Ap can be set suitably in advance by the experiment.

Particularly, it was suggested that the anchor part Ap can be formed by reducing the rotating speed of the tool 10 when the temperature of the joined part Wa is high, and increasing the pressing force of the tool 10 when the joining time is long.

Note that, in the friction stir joining device 101 according to Embodiments 1 and 2 described above, although the first position, the first period, the rotational speed of the tool 10, and the pressing force are set in advance suitably by the experiment, it is not limited to this configuration. The first position and the first period may be set, and the control device 110 may carry out a feedback control of the linear-movement driver 7 and the rotary driver 8 based on the temperature information of the joined part Wa detected by the temperature detector.

It is apparent for the person skilled in the art that many improvements or other embodiments of the present disclosure are possible from the above description. Therefore, the above description is to be interpreted only as illustration, and it is provided in order to teach the person skilled in the art the best mode that implements the present disclosure. The details of the structures and/or the functions may be changed substantially, without departing from the present disclosure.

INDUSTRIAL APPLICABILITY

Since the friction stir joining device and the method of operating the same of the present disclosure can fully join the to-be-joined object comprised of the first member, the second member, and the third member, they are useful. Moreover, since the joint structure according to the present disclosure can provide the strong joint structure by fully joining the to-be-joined object which is comprised of the three members, it is useful.

DESCRIPTION OF REFERENCE CHARACTERS

2 Base
3 Movable Body
4 Tool Holder
5 Curved Frame
6 Support Table
7 Linear-movement Driver
8 Rotary Driver
9 Robot
10 Tool
10a First Tip-end Part
10b Second Tip-end Part
10c Tip-end Face
10d Tip-end Face
41 First Softened Part
42 Second Softened Part
101 Friction Stir Joining Device
110 Control Device
110a Processor
110b Memory
110c First Data
Ap Anchor Part
h Height
ha Height
r1 Length
r2 Length
t1 Height
t2 Height
t3 Height
W To-be-joined Object
W1 First Member
W2 Second Member
W3 Third Member
Wa Joined Part
X Axis

What is claimed is:

1. A method of operating a friction stir joining device configured to join a to-be-joined object having a first member, a second member, and a third member located in that order with the third member forming a bottom-most member, the friction stir joining device including:
   a tool formed in a cylindrical shape and configured to be rotatable on an axis and reciprocatable in a direction along the axis;
   a rotary driver configured to rotate the tool on the axis; and
   a linear-movement driver configured to reciprocate the tool along the axis,
   wherein the second member and the third member have melting points higher than the first member, and
   wherein the third member has a hardness higher than the second member,
   the method comprising the steps of:
   (A) disposing the tool so as to oppose the first member of the to-be-joined object;
   (B) operating the linear-movement driver and the rotary driver so that a tip-end part of the tool presses a joined part of the to-be-joined object while the tool is rotated;
   (C) operating the linear-movement driver and the rotary driver so that the third member is softened and extends above an upper surface of the second member to form an anchor part, and the tip-end part of the tool reaches a given first position set in advance; and
   (D) operating the linear-movement driver and the rotary driver so that the tool is drawn out from the joined part while the tool is rotated.

2. The method of claim 1, wherein the tip-end part of the tool has a first tip-end part and a second tip-end part located on a base-end side of the first tip-end part,
   wherein the first tip-end part and the second tip-end part are each formed in a truncated cone shape, and
   wherein the first tip-end part is formed so that an area of a tip-end face thereof becomes smaller than an area of a tip-end face of the second tip-end part.

3. The method of claim 1, wherein (C) includes operating the linear-movement driver and the rotary driver so that the tip-end part of the tool reaches the first position within a given first period set in advance.

4. The method of claim 3, wherein the friction stir joining device further includes a temperature detector configured to detect a temperature of the joined part, and wherein (C) includes operating the linear-movement driver and the rotary driver so that the tip-end part of the tool reaches the first position within the first period based on the temperature detected by the temperature detector.

5. The method of claim 4, wherein the friction stir joining device further includes a storage device configured to store first data indicative of a correlation between the temperature of the joined part, and a pressing force and a rotational speed of the tool, and wherein (C) includes operating the linear-movement driver and the rotary driver based on the first data stored in the storage device.

6. The method of claim 1, wherein the linear-movement driver and the rotary driver are controlled such that (i) the tip-end part of the tool reaches a first position that contacts a portion of the third member, and (ii) the tip-end part of the tool reaches the first position within 11 seconds or less.

\* \* \* \* \*